United States Patent [19]
DiFranco

[11] Patent Number: 5,560,408
[45] Date of Patent: Oct. 1, 1996

[54] SHELF PIN BORING GUIDE

[76] Inventor: Charles DiFranco, 9 John Lenhardt Dr., Hamilton Square, N.J. 08690

[21] Appl. No.: 507,047

[22] Filed: Jul. 25, 1995

[51] Int. Cl.[6] ............................ B27C 5/00; B23B 47/00; B23B 49/00
[52] U.S. Cl. ..................... 144/144.1; 33/567; 33/571; 144/144.51; 144/93.1; 144/104; 144/365; 144/372; 408/115 R; 408/110; 409/130
[58] Field of Search ............................ 33/197, 533, 562, 33/567, 571; 408/103, 110, 45 B, 115 R; 409/125, 130, 182; 144/93.1, 104, 144.1, 144.51, 365, 372

[56] References Cited

U.S. PATENT DOCUMENTS

| | | | |
|---|---|---|---|
| 4,168,730 | 9/1979 | Keller . | |
| 4,445,277 | 5/1984 | Keefe | 408/115 R |
| 5,056,966 | 10/1991 | Lee | 408/115 R |
| 5,281,058 | 1/1994 | Hill | 408/115 R |
| 5,407,306 | 4/1995 | Klapperich | 408/115 R |

Primary Examiner—W. Donald Bray
Attorney, Agent, or Firm—Daniel Kramer

[57] ABSTRACT

A plate-like guide for precisely positioning a plunge router for the purpose of boring a series of holes in a work piece. The plunge router is provided with a guide bushing having an outside diameter, centrally positioned in the router working face, through which the router cutter can be pushed (plunged). The boring guide is provided with a series of spaced pilot holes positioned on a center line. The inside diameters of the pilot holes are a close sliding fit with the outside diameter of the router guide bushing. The boring guide has five positioning means usable in pairs to precisely position the boring guide with respect to the workpiece. There are two groups of fence holes into which fence pins are screwed to provide a step variable fence for positioning the pilot holes with respect to the working edge of the work piece. There is a centering notch for aligning the boring guide with a centerline drawn on the workpiece. There is an end fence hole for accepting an end fence pin for positioning the pilot precisely with respect to the work piece end. There is a pair of fence rules on each end of the boring guide and there is an index hole to accomodate an index pin which will pick up a previously bored hole to allow the line of holes to be extended beyond the length of the boring guide. Integral clamps are provided to secure the boring guide to the work piece.

13 Claims, 4 Drawing Sheets

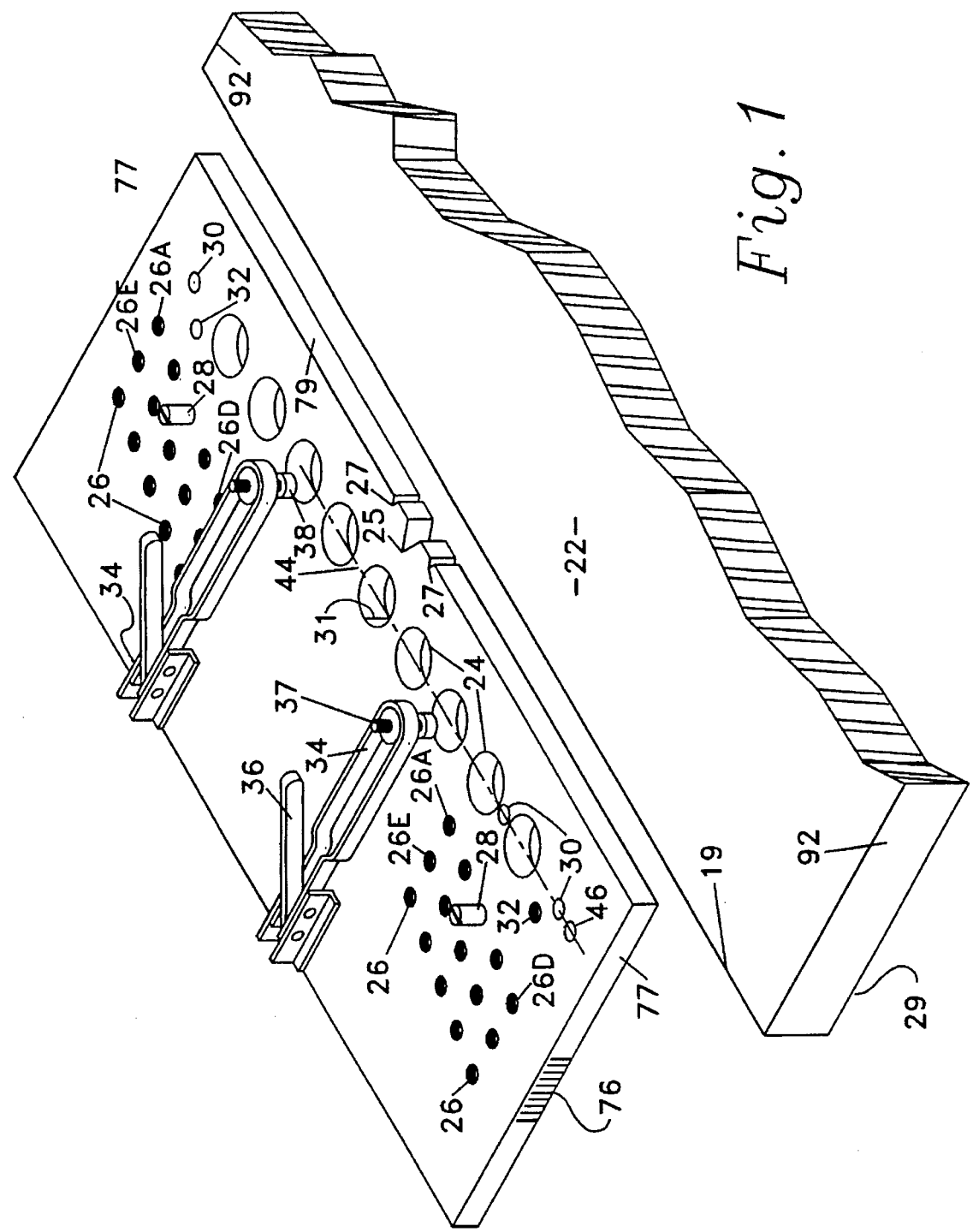

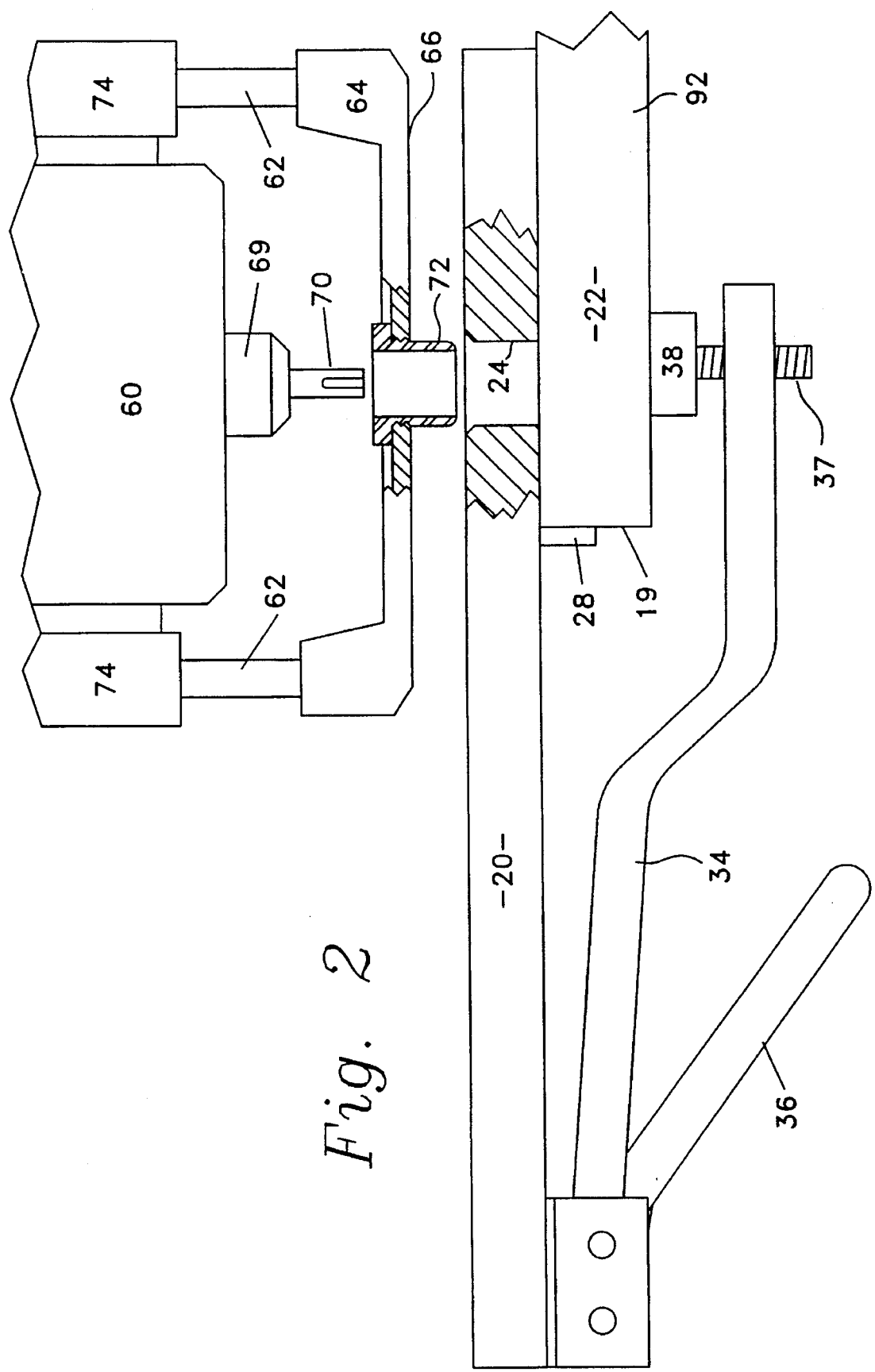

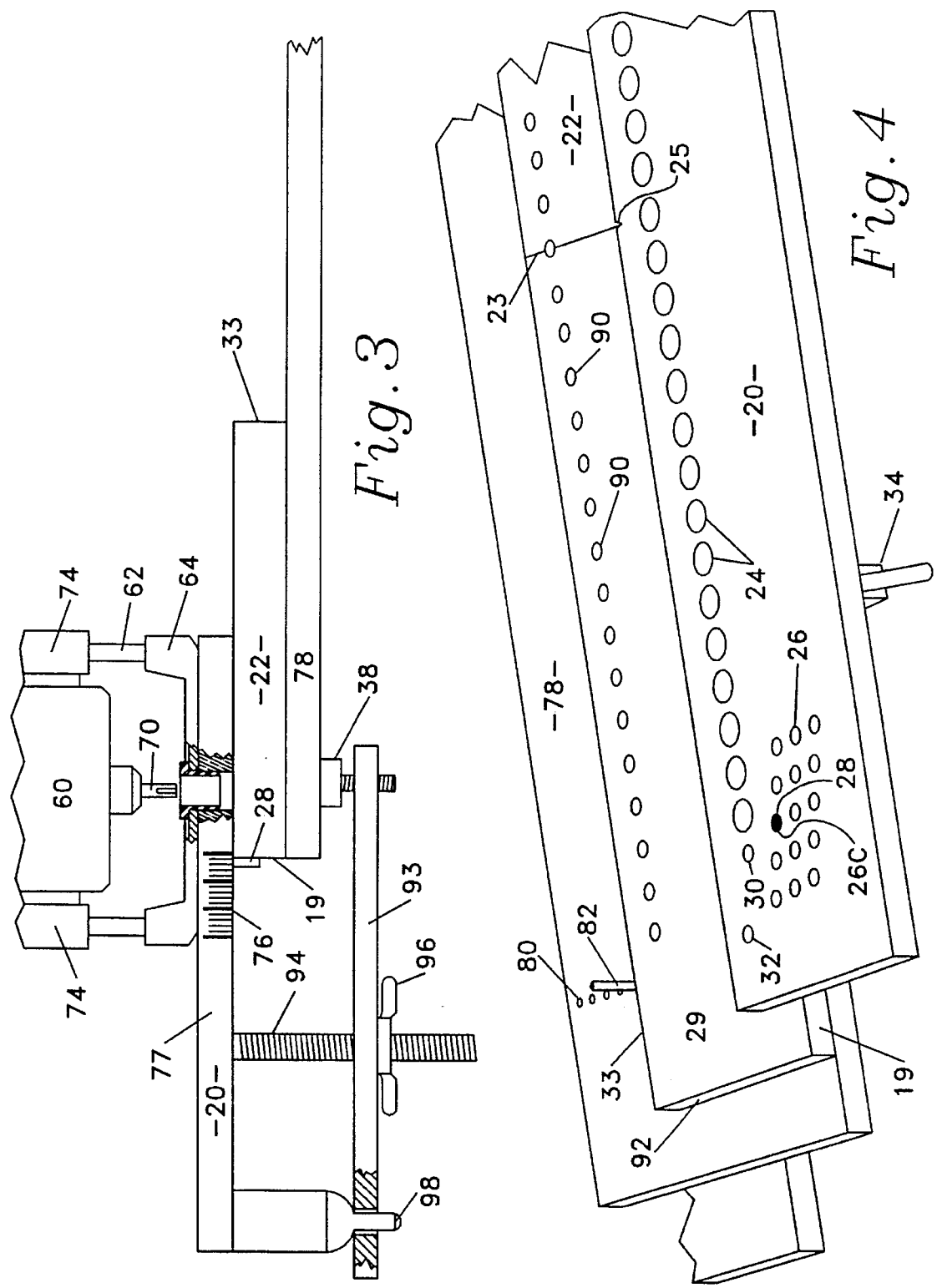

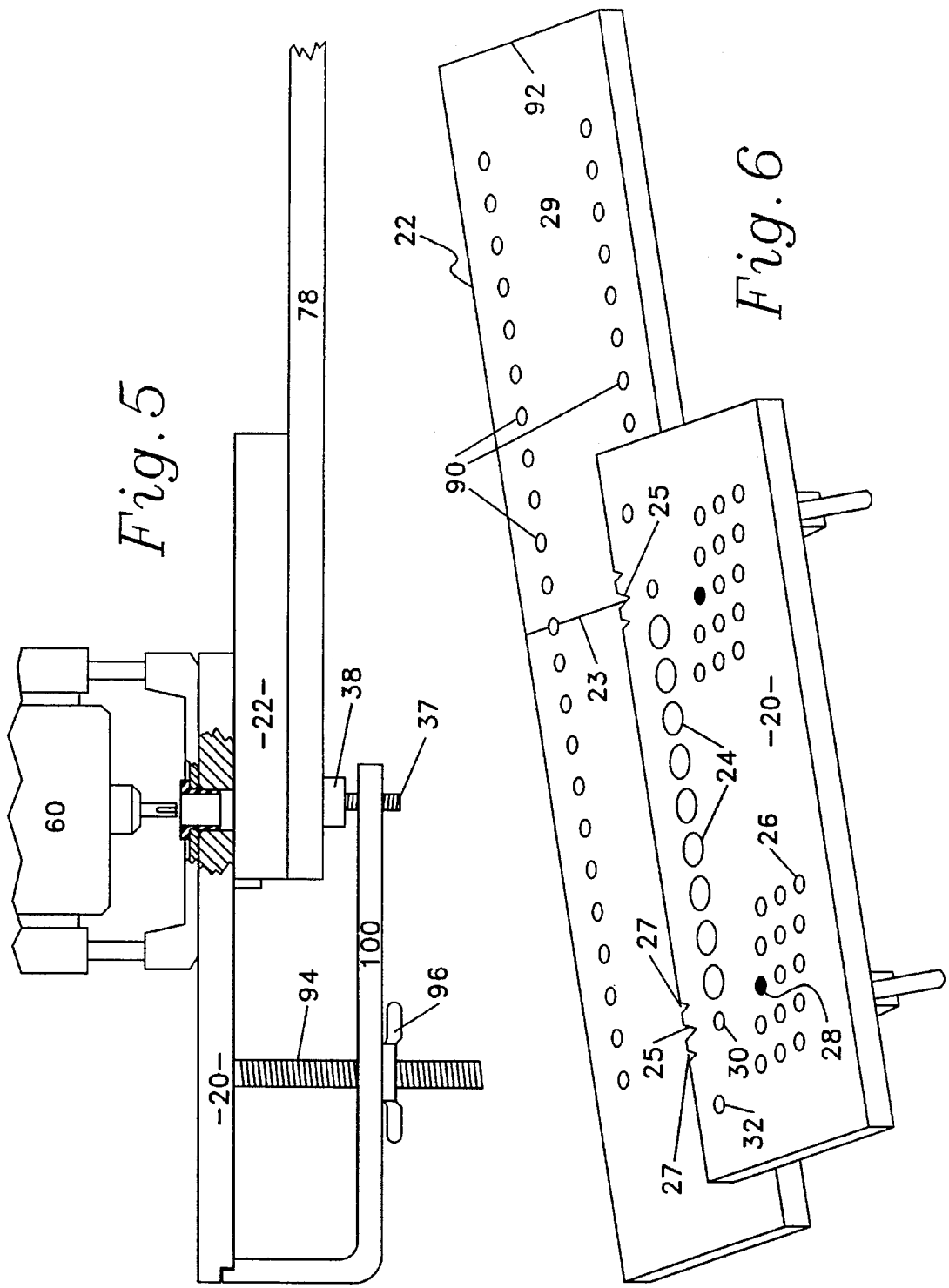

SHELF PIN BORING GUIDE

BACKGROUND

1. Field of the Invention

My invention relates to positioning jigs for positioning the cutter of plunge routers for the purpose of establishing multiple sets of four holes, each set of four holes consisting of two pair, each pair positioned at the same precise distance from the top or bottom of one of two shelf sides. The holes are for the purpose of accepting pins on which the shelf ends will lay.

2. Description of Prior Art

Bookcases have long been made with height adjustable shelves. One method of achieving height adjustability is to provide a pair of vertical side members, each side member having a double row of holes. Each double row comprises multiple pairs of holes, each pair positioned a given distance from the bottom. When pins or fixtures are placed in two holes in one side member and two corresponding, (positioned at the same distance from the bottom of the respective side member), holes in the other side member, the pins or fixtures provide supports for a shelf. A shelf positioned on such supports will be level front to back and side to side. Typically the pairs of holes will be one inch on vertical centers and be ¼ inch in diameter to accept short ¼" dowels.

Though boring jigs are well known, most have been developed for employing hand drills for drilling dowel holes in edges of a work piece. Even with a guide bushing, unskilled users will not be able to drill a hole perfectly perpendicular to the face of the workpiece. Further, most employ infinitely adjustable stops and clamps, so precise measurements must be made by the artisan to ensure correct results. Further, prior art disclosures not only require different size drills for changing hole diameters, but also require different size guide bushings to match different size drills.

Also, prior art disclosures require long jigs to accommodate the long rows of holes required by high shelving. In addition, ordinary twist drills employed in hand drills are not normally capable of drilling clean edged holes of precise diameters in wood, let alone the more difficult-to-drill flake board and laminate, without tearing the surface.

Further, even when a drilling jig is provided with a line of spaced holes having a pitch, there is no provision for providing intermediate holes positioned at exactly one half pitch from the adjoining holes.

Further, none of the guides or jigs have a planar working surface for coacting with the working face of a plunge router.

Also, prior art guides and jigs have a multiplicity of parts and components which are easily lost, costly to produce and whose use is not intuitive, thereby requiring extensive instruction and practice before decent results can be secured.

ADVANTAGES AND OBJECTS OF THE PRESENT INVENTION

Therefore it is an object of the present invention to provide at least the following merits and advantages over the jigs and guides of the prior art.

It precisely positions different size drills without changing guide bushings.

It provides fence stops positioned at discrete intervals so different edge to hole line measurements can be secured without employing a ruler or scale.

By providing a planar working surface, it coacts perfectly with high speed plunge routers, thereby enabling use of carbide cutters suitable for drilling thousands of perfect holes in flake board or laminates, as well as wood, without sharpening or replacement.

It ensures holes perfectly perpendicular to the working surface, even when it is used by an unskilled person.

It allows use of a short jig to be precisely repositioned to bore a long line of holes in a single long side-piece with perfect repetitive spacing and without measurement.

It provides perfectly spaced holes on a given pitch, or on a pitch half of the given pitch, without the use of measuring devices.

It has only three loose parts and these are simply threaded pins which can be fabricated on-site by sawing the heads off threaded bolts.

Because of the few parts and general simplicity of design, its use is intuitive and perfect results are achieved during first use, even by a craftsman of low skill.

Further objects and advantages are to provide a shelf pin boring guide of unmatched simplicity and reliability which provides superior results even when applied by a user of limited skills with little or no training. Still further objects and advantages will become apparent from a consideration of the ensuing description.

SUMMARY OF THE INVENTION

A planar hole guide for use with a plunge router having a working face and a motor driven cutter and a guide bushing having a diameter protruding from the working face for the purpose of precisely positioning holes with predetermined spacing from the end and from the edge of a workpiece. Means for plunging the cutter through the guide. Pilot holes having an inside diameter are positioned with a discrete spacing in a linear array on the surface of the hole guide, the inside diameter of the pilot hole being selected to provide for slidingly receiving the guide bushing. A stop for positioning the pilot holes at a particular distance from the edge and from the end of a workpiece is provided. And there are means for clamping the hole guide to the workpiece.

BRIEF DESCRIPTION OF THE DRAWINGS

The forgoing summary as well as the following description of preferred embodiments of the invention, will be better understood when read in conjunction with the appended drawings. For the purpose of illustrating the invention there are shown in the drawings embodiments which are presently preferred, it being understood, however, that the invention is not limited to the specific instrumentalities or to the precise arrangement of elements disclosed.

FIG. 1 is an isometric view of the underside of the guide plate of the present invention.

FIG. 2 is a side elevation in partial cross-section of the guide plate of the invention shown in operating position with the plunge router and work piece.

FIG. 3 is a representation in side elevation and partial cross-section of the guide plate of the invention showing a different style clamp and index marks.

FIG. 4 illustrates a partial isometric view of the guide plate positioned on a work piece with respect to a drawn centerline and with index holes for securing additional spaced holes and for securing holes at one half the integral hole spacing.

FIG. 5 shows a side elevational view of the guide plate of the invention in partial cross-section illustrating a clamp variation.

FIG. 6 depicts an embodiment of the invention having only half the initial number of pilot holes, but with centerline indexes positioned at both ends of the guide plate.

DETAILED DESCRIPTION OF THE INVENTION

Referring now to the drawings, wherein like references are employed to indicate like elements, there is shown in FIG. 1a workpiece 22. The workpiece 22 has edge 19, a top 29, a bottom and ends 92. Other parts and characteristics of the workpiece will be shown and described in connection with succeeding figures. Typically workpiece 22 will form one vertical side of a set of shelves. There will be bored in the top face 29 of workpiece 22 two rows of holes further shown and described in connection with FIGS. 4 and 6.

In FIG. 1 there is shown boring guide 20 of the present invention viewed from the bottom and showings the workface against which workpiece 22 is to be clamped. Clamps 34 are screwed or otherwise securely fastened to the bottom face of boring guide 20. Manual movement of levers 36 causes clamp pads 38 to move towards and away from the lower surface of the boring guide 20 for the purpose of clamping workpiece 22 securely to the lower surface of boring guide 22. Adjustment screws 37 allow the clamp pads 38 to be positioned to provide the desired tension or tightness of the workpiece against the boring guide.

Boring guide 22 has pilot holes 24 positioned along centerline 44 near the front edge 79 of the boring guide 22. The pilot holes 24 may be chamfered at the top or router face of boring guide 22. Typically pilot holes 24 have an inside diameter of 0.627 inches (15.93 mm) to correspond with and provide a close but sliding fit with the 0.625 inch (15.66 mm) diamater guide bushing 72 of the plunge router (FIG. 2). Though round guide bushing and pilot holes are shown, other shapes, including but not restricted to square or hexagonal would be equivalent. It is the positioning of pilot holes 24 which determine the location of the holes 90 (FIGS. 4 and 6) bored with the boring guide of the invention.

In a preferred embodiment of the invention, pilot holes 24 are spaced on one inch (25.4 mm) centers (the pitch) and the bored holes are ¼ inch (6.35 mm) in diameter. In another popular embodiment of the invention, pilot holes 24 are spaced 32 mm (1.38 inches) on centers. The 32 mm center option is widely used in European carpentry where the bored holes have 5 mm (0.197 inch) diameter.

There are provided two matrixes of edge fence positioning holes 26. In the preferred embodiment of the invention, edge fence holes 26 are internally threaded to accommodate a ¼ inch diameter (6.35 mm) fence pin threaded at one end 20 threads per inch (¼–20). In other embodiments of the invention other means of securing edge fence pins 28 in holes 26 are employed such as tapers, split ends or polymeric inserts or o-rings.

Each lettered edge fence hole (26B–26E) is typically ¼ inch (6.35 mm) further from center line 44 of pilot hole 24 than its closer neighbor. The edge fence holes 26 are arranged in two folded arrays having the form of a parallelogram, each array being positioned near one end of the boring guide 20. In other embodiments of the invention, edge fence holes 26 are positioned along a single line at each end of the boring guide. In still other embodiments, only a single edge fence hole at each end of the guide is provided.

When edge fence pins 28 are screwed into correspondingly lettered fence holes 26, they provide a precise fence position against which the edge 19 of work piece 22 will be positioned before being clamped securely to the boring guide by clamps 36. The workpiece 22 thus positioned ensures that, without measurement, the center of the line of holes bored will be parallel to edge 19 of the workpiece and the anticipated distance from it.

Several alternate means are provided for positioning the boring guide longitudinally with respect to the workpiece.

Centerline notch 25, shown operatively positioned on the front edge of the boring guide in FIGS. 4 and 6, has its apex in the centerline of a pilot hole 24 drawn perpendicular to centerline 44. An alternate position 31 for centerline notch 25 is within pilot hole 24 itself.

Centerline indexes 27 have their apexes positioned (offset) ½ pitch distance from notch 25. An alternate position for index 27 is an odd (1,3,5,7, ... ) integer multiple of one half the distance between two adjacent pilot holes. These offset notches are employed when it is desired to provide a second set of holes in a workpiece exactly midway between the hole set bored with the boring guide positioned on centerline with centerline index 25.

In certain cases it is desirable to establish the hole line in the workpiece with respect to an end (or the ends) of the workpiece. For that purpose end fence holes 32 are provided. These end fence holes 32 are positioned to cause the first bored through the nearest pilot hole, to be a predetermined distance from the end 92 of the workpiece, when an end fence pin is inserted into the end fence hole and the end 92 of the work piece is positioned securely both against the end fence pin inserted in end fence hole 32 and the edge fence pins 28.

The overall length of boring guide 20 is a matter both of economics and of user convenience. Shorter boring guides 20, having fewer pilot holes 24 will generally be more convenient to use and lower in cost. Means are provided to employ a shorter boring guide to bore an line of hole of unlimited length by providing index holes 30 at each end of the linear array of pilot holes. Index holes 30 are positioned exactly one pitch (or an integral multiple of one pitch) from its adjacent pilot hole. When it is desired to extend a line of holes 90 already bored in workpiece 22, a short dowel of the correct size (not shown) is inserted in the last hole 90 bored in the work piece and the boring guide is positioned so the workpiece is firmly against the edge fence pins 28 and so that hole 32 engages the dowel, thereby exactly positioning the boring guide so that the first and all successive holes bored through the pilot holes have exactly the same pitch relative to the last set of bored holes.

A second index hole 46 is provided which is positioned on centerline 44 of pilot holes 24 but is one half pitch distance further (or closer) to the pilot holes 24 than the on-pitch index hole 32. Index hole 46 may be positioned midway between two pilot holes 24. Index hole 46 is employed when it is desired to provide a precisely spaced set of shelf holes intermediate to the primary set of shelf holes initially bored through pilot holes 24.

FIG. 2 is an end elevation in partial cross-section of the boring guide 20 with the workpiece 22 clamped in position against the guide workface by clamp 36. Pilot hole 24 is shown in cross-section along with the guide bushing 72 portion of plunge router. Pilot hole 24 typically has an inside diameter (or guiding dimension) 0.002 inches (0.05 mm) larger that the outside diameter (or guiding dimension) of guide bushing 72. The plunge router includes base 64 having working face 66 through which protrudes the centrally positioned guide bushing 72. Arising from and postioned perpendicular to the base working face 66 are a pair of rails 62 upon which slides 74 are springingly mounted. Slides 74 are mechanically integral with motor 60. Motor 60 has a shaft upon which a chuck 69, holding cutter 70, is mounted. Cutter 70 typically is a solid carbide tool which is driven at speeds ranging from 10,000 to 25,000 rpm, far higher than obtainable with hand drills. The plunge arrangement of the router allows the bushing to be positioned in pilot hole 24 and the router face pressed securely against the upper or router face of boring guide 20 before the motor with attached cutter, rotating at high speed, is deliberately pressed down, causing the cutter to bore its perfectly true and perpendicular hole at precisely the correct spot as determined by the boring guide.

Further, since the hole in the guide bushing is much larger than the largest cutter likely to be required, the cutter diameter can be changed without changing the guide bushing and without sacrificing the precision or perpendicularity with which the hole is positioned and bored, a substantial improvement over the prior art.

FIGS. 3 and 5 show similar constructions in which shop made clamps are employed. The clamp of FIG. 3 illustrates a fulcrum 98 fastened to the back edge of the boring guide 20 with a straght clamp bar 93 to which clamp pad 38 is secured. Screw 94 with wing nut 96 provides the clamping force. In FIG. 5 a bent clamp bar 100 is provided with the same screw 94 and wing nut 96.

In FIGS. 1 and 3 there is shown scale 76 which is positioned on both the end faces 77 of the boring guide. The scales 76 both are positioned with their origin at the pilot hole centerline 44. Scale 76 is employed under the unusual conditions where a row of shelf pin holes having an unusual or non-standard spacing from the working edge must be provided or duplicated.

FIG. 4 illustrates the positioning of the boring guide 20 on workpiece 22 where the boring guide is positioned against a fence pin 28 located in fence hole 26C, thereby determining the distance of the shelf pin holes from the working edge 19 of workpiece 22 and where the boring guide is positioned longitudinally by positioning notch 25 over centerline 23, having been previously drawn on the workpiece 22. In FIG. 4 are also shown shelf pin holes 90 which had already been bored using the boring guide. There is shown also in FIG. 4 a shop built fixture 78 which is equipped with stop holes 80 and stop pins 82. In one mode of use the fixture 78, and the workpiece 22 are clamped together with the boring guide 20 to provide a firm base on which to rapidly position and operate the plunge router to quickly bore the desired row of holes.

In FIG. 6 there is shown an economical and compact version of the boring guide which has a length approximately half the full sized version. In this embodiment of the invention, shown in FIG. 6, the centering notches 25 and 27 are positioned at the ends of the boring guide, thereby allowing only the holes on one side of the centerline 23 to be bored at at time.

From the foregoing description, it will be apparant that the presently described invention comprises a greatly improved device for precisely line boring multiple sets of holes in a workpiece. It will be appreciated by those skilled in the art that changes could be made to the above described embodiments without departing from the broad inventive concepts thereof. It must be understood, therefore, that this invention is not limited to the particular embodiments described, but is intended to cover all the modifications which are within the scope and spirit of the appended claims and equivalents thereof.

I claim:

1. Hole spacing jig means for use with a plunge router for producing spaced holes in a workpiece having a working edge and a working end, the plunge router having a base with a motor side and a working side, the working side having a substantially planar surfaces, a cutter;

motor means with extended shaft for receiving and driving the cutter;

alignment means attached to the base for engaging the jig means, the alignment means comprising a tubular element having an outside diameter, the element being positioned substantially coaxially with the motor shaft and arranged to extend away from both the motor and the planar working working side of the base;

means secured to the base for slidingly supporting the motor means and for positioning the motor means with its shaft substantially perpendicular to the planar base working side and for allowing guided movement of the motor means toward and away from the base whereby the cutter can be plunged through and past the working side of the base and the alignment means and withdrawn;

and where the jig means comprises:

a rigid plate having a length, a width, two ends, a router face and a workface, the plate having a linear array of pilot holes, the pilot holes having centers and an inside dimension, the centers being spaced along a first straight line, and the inside dimension being being selected to provide a close but sliding fit with the outside dimension of the router alignment means;

means for positioning the pilot holes with respect to the work piece, the positioning means comprising alignment pins, holes in the plate adapted to receive and retain the alignment pins to establish the position of the pilot holes, with respect to a working edge and a working end of the workpiece, the alignment holes being positioned on one side of the array of pilot holes.

2. Hole spacing jig means as recited in claim 1 where the center spacing between adjacent pilot holes along the first line is uniform and is a distance.

3. Hole spacing jig means as recited in claim 2 further providing said workpiece includes a spaced hole and further providing that the jig means includes index means for establishing the position of the pilot holes with respect to the spaced hole.

4. Hole spacing jig means as recited in claim 2 further providing a centermark positioned on the workpiece and further providing first index means positioned on the jig means for positioning the jig means with respect to the workpiece centermark.

5. Hole spacing jig means as recited in claim 4 where the center mark index means on the jig means is positioned on the inside diameter of a pilot hole.

6. Hole spacing jig means as recited in claim 4, further providing a pair of alignment hole matrixes, each matrix being positioned near an end of the jig means, each matrix have a series of alignment holes, each hole being spaced a fixed distance further from the first line than its closer neighbor.

7. Hole spacing jig means as recited in claim 6 where the holes in each matrix are spaced on straight lines positioned in the form of a parallelogram.

8. Hole spacing jig means as recited in claim 4, further providing a second centermark index means for positioning the jig means with repect to the workpiece centermark, the second centermark index means being spaced from the first centermark index by an odd integer multiple of one half the distance between two adjacent pilot holes.

9. Hole spacing jig means as recited in claim 4, where the centermark index means is positioned substantially midway between the two ends of the jig means.

10. Hole spacing jig means as recited in claim 4 where the centermark index means is positioned substantially adjacent an end of the jig means.

11. Hole spacing jig means as recited in claim 4 further providing integral clamp means positioned on the workface of the jig means for securing the workpiece to the jig means.

12. Hole spacing jig means as recited in claim 7 further providing measuring scales on both ends of the jig means.

13. Hole spacing jig means as recited in claim 12 where the measuring scales indicate distance from the pilot hole centerline.

* * * * *